US010467003B1

(12) United States Patent
Mendonca et al.

(10) Patent No.: US 10,467,003 B1
(45) Date of Patent: Nov. 5, 2019

(54) DIVIDED EXECUTION AND STORAGE OF SCRIPTS

(71) Applicant: Amazon Technologies, Inc., Seattle, WA (US)

(72) Inventors: Melonia Mendonca, Seattle, WA (US); Patrick McFalls, Seattle, WA (US); Sivaprasad Venkata Padisetty, Bellevue, WA (US); Amjad Hussain, Bellevue, WA (US); Ananth Vaidyanathan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 64 days.

(21) Appl. No.: 15/793,463

(22) Filed: Oct. 25, 2017

Related U.S. Application Data

(60) Provisional application No. 62/570,069, filed on Oct. 9, 2017.

(51) Int. Cl.
*G06F 8/71* (2018.01)
*G06F 8/73* (2018.01)
*G06F 8/60* (2018.01)
*G06F 8/10* (2018.01)

(52) U.S. Cl.
CPC .................. *G06F 8/71* (2013.01); *G06F 8/10* (2013.01); *G06F 8/60* (2013.01); *G06F 8/73* (2013.01)

(58) Field of Classification Search
CPC ..... G06F 8/10; G06F 8/36; G06F 8/60; G06F 8/61; G06F 8/70; G06F 8/71; G06F 8/72; G06F 8/73; G06F 9/45558; G06F 2009/45562

USPC ...................... 717/168–178; 718/1, 100, 101
See application file for complete search history.

(56) References Cited

U.S. PATENT DOCUMENTS

| 6,691,176 | B1 * | 2/2004 | Narin ...................... G06F 9/542 719/318 |
| 7,246,351 | B2 * | 7/2007 | Bloch ....................... G06F 8/61 715/700 |
| 7,356,767 | B2 * | 4/2008 | Dahyabhai .......... G06F 9/44526 715/209 |
| 7,899,801 | B1 * | 3/2011 | Bronson ............ G06Q 30/0251 707/706 |
| 8,429,649 | B1 * | 4/2013 | Feathergill .......... G06F 9/45558 718/1 |
| 8,493,386 | B2 * | 7/2013 | Burch ..................... G06T 19/20 345/419 |
| 8,978,010 | B1 * | 3/2015 | Thumfart ................ G06F 8/433 717/123 |

(Continued)

OTHER PUBLICATIONS

F. Kawsar, T. Nakajima, J. H. Park and Y. Jeong, "A Document Based Framework for Smart Object Systems," 2008 Second International Conference on Future Generation Communication and Networking, Hainan Island, 2008, pp. 178-183. (Year: 2008).*

*Primary Examiner* — Andrew M. Lyons
(74) *Attorney, Agent, or Firm* — Lowenstein Sandler LLP

(57) ABSTRACT

A processing device executes a first script, wherein the first script comprises one or more actions to be performed. The processing device determines that the first script comprises a reference to a second script stored in a remote data store. The processing device retrieves the second script over a network from the remote data store and executes the second script. The first script and the second script may be stand-alone scripts or scripts encapsulated within documents.

20 Claims, 9 Drawing Sheets

(56) References Cited

U.S. PATENT DOCUMENTS

| | | | | |
|---|---|---|---|---|
| 9,225,511 B1* | 12/2015 | Wharton | | H04L 9/00 |
| 9,294,334 B2* | 3/2016 | Rosenstein | | G06Q 30/02 |
| 10,032,037 B1* | 7/2018 | Allen | | G06F 21/57 |
| 2004/0261055 A1* | 12/2004 | Bertelrud | | G06F 8/41 |
| | | | | 717/106 |
| 2007/0280206 A1* | 12/2007 | Messer | | H04L 12/66 |
| | | | | 370/352 |
| 2008/0189593 A1* | 8/2008 | Baker | | H04L 67/34 |
| | | | | 715/207 |
| 2008/0263566 A1* | 10/2008 | Buerge | | G06F 16/00 |
| | | | | 719/317 |
| 2010/0198945 A1* | 8/2010 | Odaka | | G06F 16/4393 |
| | | | | 709/219 |
| 2011/0078333 A1* | 3/2011 | Jakubowski | | H04L 67/1095 |
| | | | | 709/248 |
| 2011/0119220 A1* | 5/2011 | Seolas | | G06F 17/2247 |
| | | | | 706/47 |
| 2012/0266158 A1* | 10/2012 | Spivak | | G06F 9/5055 |
| | | | | 717/175 |
| 2013/0124807 A1* | 5/2013 | Nielsen | | G06F 11/1438 |
| | | | | 711/162 |
| 2013/0132422 A1* | 5/2013 | Rogish | | G06F 16/958 |
| | | | | 707/769 |
| 2014/0033276 A1* | 1/2014 | Wibbeler | | G06F 21/51 |
| | | | | 726/4 |
| 2015/0088968 A1* | 3/2015 | Wei | | H04L 67/10 |
| | | | | 709/203 |
| 2015/0120821 A1* | 4/2015 | Bendell | | G06F 16/957 |
| | | | | 709/203 |
| 2015/0128139 A1* | 5/2015 | Suzuki | | G06F 8/63 |
| | | | | 718/1 |
| 2016/0028805 A1* | 1/2016 | Michaud | | H04L 43/12 |
| | | | | 709/203 |
| 2016/0062736 A1* | 3/2016 | Stanfill | | G06F 8/10 |
| | | | | 717/105 |
| 2016/0189248 A1* | 6/2016 | Boyle | | G06Q 30/0277 |
| | | | | 705/14.73 |
| 2016/0378449 A1* | 12/2016 | Khazanchi | | G06F 8/71 |
| | | | | 717/120 |
| 2017/0322929 A1* | 11/2017 | Hussain | | G06F 9/45558 |
| 2018/0018149 A1* | 1/2018 | Cook | | G06F 8/70 |
| 2018/0081652 A1* | 3/2018 | Ahmed | | G06F 8/4442 |
| 2018/0157592 A1* | 6/2018 | Ivanov | | G06F 12/0875 |
| 2018/0302291 A1* | 10/2018 | Srinivasan | | G06F 9/45558 |

* cited by examiner

```
{
  "schemaVersion":"X",
  "description": "Call Retrieval Plugin Document",
  "parameters":{
    "locationType":{
       "type": "String",
       "description": "Source of the document",
    },
    "locationInfo":{
       "type": "StringMaps",
       "description": "Methods to obtain the document or the script from the source",
    },
    "entireDirectory":{
       "type": "String",
       "description": "Specify if the entire directory needs to be pulled down for the script",
       "allowedValues": [
              "true",
              "false"
         ]
    },
    "runtimeParameters":{
        "type": "StringList",
        "description": "List of parameters for the plugin being called",
    },
  "runtimeConfig":{
    "Retrieval_Plugin":{
       "properties":{
          "locationType": "{{ locationType }}",
          "locationInfo": "{{ locationInfo }}",
          "entireDirectory": "{{ entireDirectory }}",
          "runtimeParameters": {{ runtimeParameters }}
       }
    }
  }
}
```

FIG. 7

DIVIDED EXECUTION AND STORAGE OF SCRIPTS

RELATED APPLICATIONS

This patent application claims the benefit under 35 U.S.C. § 119(e) of U.S. Provisional Application No. 62/570,069, filed Oct. 9, 2017, which is incorporated by reference herein.

BACKGROUND

Enterprises use system managers to automatically collect software inventory, apply operating system (OS) patches, create system images, configure operating systems, and install applications on operating systems for fleets of devices. The system managers help to define and track system configurations, prevent drift and maintain compliance of device configurations.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only. Further, it should be understood that the drawings are not necessarily proportional or to scale.

FIG. 7 illustrates an example document that includes a call retrieval plugin, according to one embodiment of the present disclosure.

DETAILED DESCRIPTION

Figure 1:
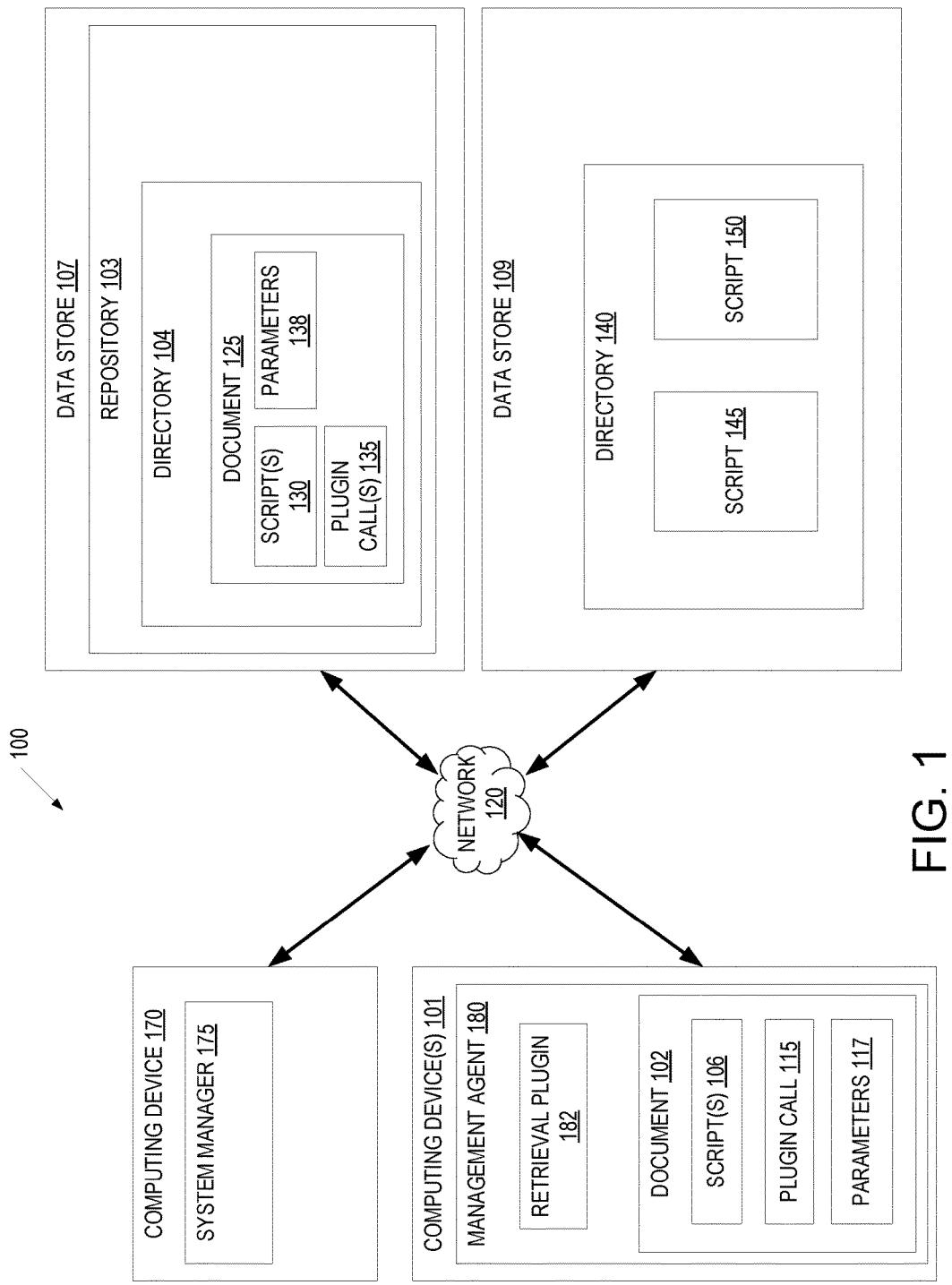
FIG. 1 illustrates a system architecture containing a system manager, a management agent and multiple remote repositories, according to one embodiment of the present disclosure.

The present disclosure relates to management of enterprise computing devices, such as virtual machines running in a cloud environment, physical machines deployed at an enterprise location, and so forth. An enterprise may have hundreds or thousands of computing devices, each of which is maintained by the enterprise. Manual setup, configuration and maintenance of a large number of computing devices is impracticable. Accordingly, system managers may automate the tasks associated with configuring operating systems, deploying virtual machines, installing applications, installing updates and patches, and so on for large numbers of computing devices.

Embodiments enable a system manager to perform operations including configuring operating systems, deploying virtual machines, installing applications, installing updates and patches, and so on using documents and scripts that are stored in a remote repository that is external to the management system and to the location or environment that includes the computing devices to be updated, configured, etc. Additionally, embodiments enable such operations to be divided among multiple scripts and documents stored in various locations, where the scripts and documents may reference each other to form a string of scripts and documents that can be assembled on the fly into a single execution queue. Accordingly, embodiments enable the creation of composite documents and scripts that span multiple files and/or locations. This enables scripts and documents to be maintained, for example, in source-control systems such as GitHub, Helix Versioning Engine, Source Code Control System (SCCS), CodeCommit, BitBucket, and so on as well as other repositories or other data stores such as Amazon Simple Storage Service (S3), and so on. Such externally maintained scripts and documents may then be accessed by a system manager and/or management agent for performing operations. This reduces an amount of overhead associated with managing a large number of computing devices. Additionally, this enables all scripts and documents that are periodically updated to be maintained in a source control system without the additional step of moving such scripts and documents to a system manager before beginning an operation that uses such scripts and documents.

In one embodiment, an agent running on a computing device executes a first script, wherein the first script comprises one or more actions to be performed. The first script may be a standalone script or a script encapsulated within a document. The agent determines that the first script comprises a reference to a second script stored in a remote repository. The second script may also be a script encapsulated in a second document (in which case the reference may actually be a reference to the second document containing the script) or a second stand-alone script. The agent retrieves the second script (or document containing the second script) over a network from a remote repository such as a source control system. The agent then executes the second script (e.g., executes the contents of the document, which include the second script).

In one embodiment, an agent running on a computing device executes a first script of a first document, wherein the first document comprises one or more parameters and the first script is to perform one or more actions using the one or more parameters. The agent determines that the first document comprises a call to a plugin that is to retrieve a resource maintained on a source-control system, wherein the one or more parameters comprise a location of the resource maintained on the source-control system and a location type associated with the source-control system. The agent executes the plugin to retrieve the resource from the location on the source-control system using a protocol associated with the location type. The agent determines whether the resource is a second document. Responsive to determining that the resource is the second document, the agent performs one or more operations on the second document. Such operations may include demarshalling the second document, validating the second document, performing parameter resolution for the second document, etc. The agent then executes the contents of the second document (e.g., a second script included in the second document) or directly executes a second script if the resource was a script.

Referring now to the figures, FIG. 1 illustrates a system architecture containing a system manager 175, a management agent 180 and multiple remote data stores 107, 109, according to one embodiment of the present disclosure. The system manager 175 may be installed on a computing device 170, while management agents 180 may be installed on one or more computing devices 101. Computing device 170 and computing devices 101 may be connected via a network 120, and may also be connected to data store 107 and data store 109 via the network 120.

In one embodiment, the computing devices 101, 170 may each be one of a mobile phone, a smart phone, a laptop computer, a tablet computer, a netbook, a notebook, a desktop computer, a gaming console, a server computer (e.g., a rackmount server), or other type of computing device. In one embodiment, one or more of the computing devices 101, 170 is a server computing device such as a rackmount server. The computing devices 101, 170 may include physical machines and/or virtual machines hosted by physical machines. The physical machines may be rackmount servers, desktop computers, or other computing devices. In one embodiment, one or more of the computing devices 101, 170 include virtual machines managed and provided by a cloud provider system. Each virtual machine offered by a cloud service provider may be hosted on a physical machine configured as part of a cloud. Such physical machines are often located in a data center. The cloud provider system and cloud may be provided as an infrastructure as a service (IaaS) layer.

Network 120 may be a local area network (LAN), wide area network (WAN), wireless network, intranet, the Internet, or a combination thereof. Network 120 may additionally or alternatively include a direct wired connection (e.g., via an Ethernet connection, a universal serial bus (USB) connection, a Firewire connection, a Lightning connector, a peripheral component interconnect express (PCIe) connection, a serial connection, a small computer system interface (SCSI) connection, etc.), or a wireless connection (e.g., a Bluetooth® connection, a ZigBee® connection, etc.). Network 120 may additionally or alternatively include a wireless network provided by a wireless carrier, such as wireless networks that operate using second generation (2G) wireless communication standards (e.g., Global System for Mobile Communications (GSM)), third generation (3G) wireless communication standards (e.g., Universal Mobile Telecommunications Service (UMTS), Code Division Multiple Access 2000 (CDMA2000), Enhanced Data Rates for GSM Evolution (EDGE), etc.), and/or fourth generation (4G) wireless communication standards (e.g., Long Term Evolution (LTE) and Worldwide Interoperability for Microwave Access (WiMAX)) standards.

Data stores 107, 109 may be data stores having particular storage configuration and/or structure. The data stores 107, 109 may be web-based or cloud data stores (e.g., Amazon Simple Storage Service (S3), DropBox, Box, Microsoft Azure, Google Drive, etc. cloud storage), may be network attached storage (NAS), may be storage area networks (SANs), or may be other types of storage. In one embodiment, data store 107 is a source control system (also referred to as a version control system) such as GitHub, Git, Mercurial, Subversion, BitBucket, CodeCommit, or Perforce. A source control system offers distributed version control and source code management functionality, and may provide additional features such as access control, bug tracking, task management, wikis, and so on.

Data store 107 may contain one or more repositories (e.g., repository 103), where each repository is an on-disk data structure that stores metadata for a set of files or directory structure. The whole set of information in the repository 103 may be duplicated on multiple computing devices of users, or may be maintained on a single server in data store 107. The repository 103 may contain a directory 104 (or multiple directories) that contain one or more documents (e.g., document 125), one or more scripts, and/or other data. Examples of metadata that may be contained within repository 103 include a historical record of changes in the repository, a set of commit objects, a set of references to commit objects, called heads, and so on.

In one embodiment, directory 104 contains a document 125. In one embodiment, a document 102, 125 is a script. In one embodiment, document 102, 125 is a script having a particular schema. The document 102, 125 may contain one or more other scripts (or subscripts) and one or more parameters to be used by the one or more scripts. In one embodiment, document 102, 125 is an object (e.g., a JavaScript Object Notation (JSON) object, a YAML object, an Extensible Markup Language Object Model (XOM) object, a TOML object, an object having a proprietary format, etc.) that contains one or more scripts and one or more parameters (also referred to as metadata) to be used by the one or more scripts. A document may be a serialized or marshalled object when stored in a data store 107, and may be a demarshalled or deserialized object when in memory of computing device 101. One or more of the scripts included in a document and/or one or more of the portions of a script may be or include calls to plugins. Documents may have a particular schema that is dictated by system manager 175 and that is understood by the system manager 175 as well as management agents 180 deployed on computing devices 101 that will execute the contents of the documents (e.g., scripts in the documents). In one embodiment, document 125 is a YAML object or a JSON object having a particular schema.

An example document 125 is shown that includes one or more scripts 130, parameters 138 and one or more plugin calls 135. In one embodiment, an example document that includes a call to a retrieval plugin 182 has the structure as set forth in FIG. 7.

The example document includes an indication of a schema version number, a description of the document, a set of parameters for the document, and a runtime configuration for the document. The parameters include a location type, location information, an entire directory value, and one or more runtime parameters. Examples of location type include S3, GitHub, system manager storage, and so on.

Location information may be a string list that holds all of the information to be used to retrieve a resource (e.g., a document or script) from a remote location (e.g., from data store 107 or data store 109). In one embodiment, location information has the form of a string map. In one embodiment, the string map is a JSON formatted hash table or other hash table with a key type string and a value type string. In one embodiment, the location information has the form of a secure string. Based on the location type, the location information will vary. In one embodiment, if the location type is local system manager storage, then the location information may include a document name and/or a document version. In one embodiment, if the location type is a source control system such as GitHub, the location information includes a universal resources locator (URL) and may also include a commit identifier, a branch name (e.g., if a repository has multiple branches) and/or token information. In one embodiment, if the location type is a cloud storage system, then the location information may include a path to a particular document or script in the cloud storage system.

Data stores 107, 109, repositories 103 and/or directories 104, 140 may be public or private. Private locations may be accessible after authentication is performed. Different types of authentication schemes may be used by different data stores 107, 109. For example, S3 may provide a pre-signed URL that contains credentials, which can be used to access resources. On the other hand, GitHub requires that a key or token be provided.

In one embodiment, token information is a parameter that includes a JSON document or other format of data with token information to be used to access a particular directory in GitHub. The token information will include a secure string parameter for a token as well as a method to be applied for authentication (e.g., an Open Authentication (OAuth) access type). The OAuth access type is a method of using the OAuth2 protocol, or other OAuth protocol.

In the illustrated embodiment, the example document includes an entire directory parameter. If the entire directory parameter has a true value, then a retrieval plugin 182 may retrieve all of the contents of a directory as well as a specific targeted document or script (e.g., all of the contents of directory 104 or directory 140). If the entire directory parameter has a false value, then the targeted script or document will be retrieved without retrieving other contents of a directory in which the script or document is stored. The ability to retrieve an entire directory is particularly useful when the retrieval plugin points to a script. This enables a script to make calls to other scripts in the same directory without making subsequent calls to the retrieval plugin 182 and/or to have dependencies to other files. For example, script 145 may include a call to script 150.

Runtime parameters are parameters that will be provided to a retrieved script or document.

Data store 109 may include a directory 140 that contains multiple scripts 145, 150. The directory 140 may additionally include additional files with data that may be relied upon by script 145 and/or script 150. Scripts 145, 150 may be written in any scripting language.

In one embodiment, system manager 175 is a suite of management services that automatically collect software inventory, apply operating system (OS) patches, create system images, configure operating systems, install applications, update applications, and so on. These capabilities help to define and track system configurations, prevent drift between computing devices 101, and maintain software compliance of the computing devices 101. System manager 175 provides a management approach for fleets of computing devices that is designed to scale. Some examples of services that system manager 175 includes are a run command service that remotely and securely manages the configuration of managed computing devices 101 at scale, an inventory service that automates the process of collecting software inventory from managed computing devices 101, a state management service that automates the process of keeping computing devices 101 in a defined state, an automation service that automates maintenance and deployment tasks (e.g., update virtual machine images, apply driver and agent updates, apply OS patches, apply application updates, etc.), and so forth. The run command service may be used to perform ad hoc changes like updating applications, running Linux shell scripts, running Windows PowerShell commands, and so forth on a target set of dozens, hundreds or thousands of computing devices 101.

System manager 175 may perform specific tasks on computing devices, such as those set forth above, through the use of documents and scripts. System manager 175 may send a command to management agents 180 of one or more computing devices 101, where the command may include a document with an instruction to execute the contents of the document, may include an instruction to retrieve a document stored in a local data store or remote data store 107, 109 and execute the contents of the document, may include an inline script literal or document literal with an instruction to execute the inline script literal or document literal, or may include an instruction to retrieve a script from a data store 107, 109 and execute the script. As used herein, a script literal is a string that contains the contents of a script and a document literal is a string that contains the contents of a document.

Management agents 180 process commands from system manager 175 and perform operations on a computing device 101 on which they are installed. Such commands may be commands to execute scripts and/or documents, and may cause the management agent to perform actions such as configuring the computing device 101, installing software on the computing device 101, patching an OS running on the computing device 101, updating software on the computing device 101, gathering information about a configuration of the computing device 101 an OS on the computing device 101 and/or applications installed on the computing device 101, and so on.

Management agent 180 may execute scripts written in any scripting language. In one embodiment, the retrieval plugin 182 recognizes a scripting language used to generate a script (e.g., script 145 or script 150) based on an extension of the script and/or a line in the script and calls an appropriate interpreter or framework (e.g., Windows PowerShell, Linux Bash Script, etc.) to execute the script. In one embodiment, scripts may be spread across multiple documents and/or script files. Accordingly, scripts can call other scripts.

Once commands are completed, management agent 180 sends a report back to the system manager 175. The report may include an execution status, execution information, and so on. A report may also be sent before the commands are completed (e.g., if execution of a document or script fails for some reason).

In one embodiment, management agent 180 includes a retrieval plugin 182. The retrieval plugin 182 may be called by documents and/or scripts in order to retrieve other documents and/or scripts from remote data stores 107, 109. Management agent 180 may receive a command to execute a document or script that includes a call to the retrieval plugin 182 along with a set of parameters to be used by the retrieval plugin to retrieve a document or script. The set of parameters may include a location of a document or script to be retrieved. The location may be, for example, an internet protocol (IP) address and port, a universal resource locator (URL), a directory and/or repository name, a document or script name, and/or other location information, as set forth above.

The set of parameters may additionally include a location type associated with the particular data store 107, 109 that stores the document or script. Each location type may be associated with a particular communication protocol to be used in communicating with the data store 107, 109, security requirement of the data store 107, 109, and so on. The set of parameters may additionally include location information, an indication as to whether or not to retrieve an entire directory, runtime parameters to be used as inputs to a retrieved document or script, and/or other parameters.

Calls to the retrieval plugin 182 that point to a script may include an entire path to the script and/or an extension for the script. For example, a script written in python may have the extension ".py", while a script written in Ruby may have the extension ".rb" in some embodiments. This enables the retrieval plugin 182 to leverage an association between a particular extension type and a particular framework or interpreter on an underlying operating system. In one embodiment (e.g., where Linux is the underlying operating system), the script may include a line with a hash-bang (#!) notation followed by a path to an interpreter (e.g., #!/usr/bin/python) to enable the appropriate framework or interpreter to be used to process the script.

In one embodiment, system manager 175 sends management agent 180 a command to execute document 102. Management agent 180 may then retrieve the document 102 from local storage of system manager 175, or the command may include the document 102. As shown, the document 102 includes one or more scripts 106, parameters 117 and a plugin call 115 to retrieval plugin 182. In one embodiment, the parameters provide information usable by retrieval plugin 182 to retrieve document 125 from repository 103 in data store 107. Management agent 180 may execute the scripts 106 of the document 102, may call retrieval plugin 182 using the parameters 117 of document 102, and may download document 125 from data store 107.

Management agent 180 may then execute the contents of document 125, which include scripts 130, one or more plugin calls 135 and parameters 138. Plugin calls 135 may include an additional call to retrieval plugin 182. Management agent 180 may execute scripts 130 and may use parameters 138 of document 125 to retrieve script 145 from data store 109. In one embodiment, parameters 138 include an entire directory=true value, and so management agent 180 retrieves both script 145 and script 150. Management agent then executes script 145 and script 150 (which may be called by script 145).

Figure 2:
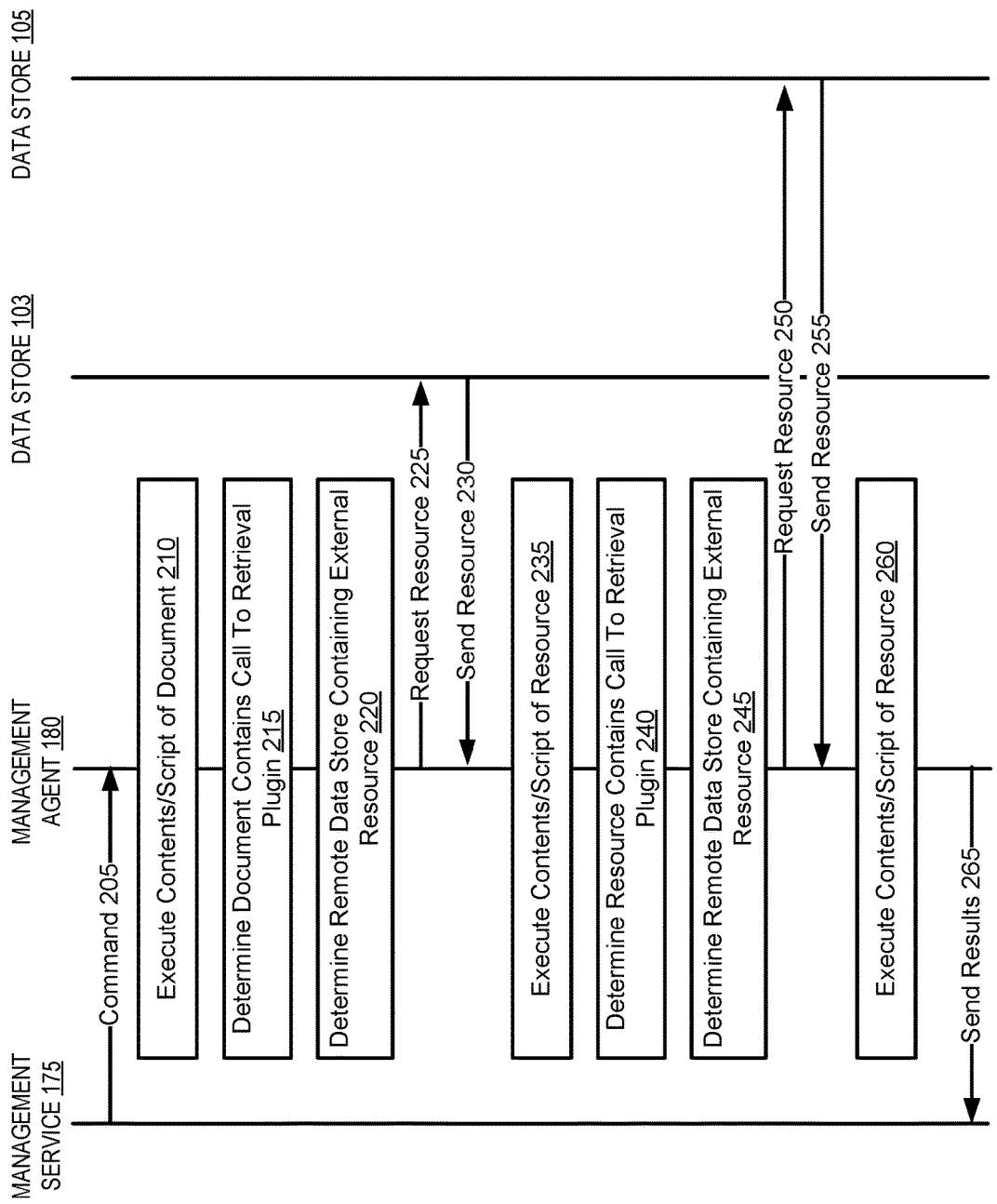
FIG. 2 is a sequence diagram illustrating a process for executing, at a management agent, documents and/or scripts maintained in a remote repository, according to one embodiment of the present disclosure.

FIG. 2 is a sequence diagram illustrating a process for executing, at a management agent 180, documents and/or scripts maintained in a remote repository, according to one embodiment of the present disclosure. The sequence diagram includes the parties of a management service 175, a management agent 180, a data store 103 and a data store 105.

A sequence begins with management service 175 sending a command to management agent 180. In one embodiment, the command may include a string that is either a document literal or a script literal for a document or script to be executed by the management agent 180. In one embodiment, the command includes as an attachment a document or script (e.g., a marshalled or serialized document or script). In one embodiment, the command includes a pointer or reference to a script or document that is locally stored by the management service 175. In one embodiment, the command includes a call to execute a retrieval plugin to retrieve a remotely stored document or script.

At block 210, the management agent executes the contents of the document or script. In one embodiment, the management agent first retrieves the document or script either from local storage or from remote storage (e.g., from data store 103 or data store 105). In one embodiment, the management agent executes the retrieval plugin to retrieve the document or script from the external storage.

At block 215, the management agent determines that the executed document or script includes a call to a retrieval plugin and associated parameters to use for the call to the retrieval plugin. At block 220, the management agent determines a remote data store containing an external resource. The external resource may be a document (e.g., that contains an encapsulated script) or a stand-alone script, for example.

At block 225, the management agent 180 sends a request for the resource to data store 103. The request may be sent using particular location information such as a particular communication protocol indicated in the parameters. In one embodiment, the parameters include a location type, and the communication protocol to use is associated with (and possibly determinable from) the location type. At block 230, the data store 103 sends the resource (e.g., the script or document) to the management agent 180.

At block 235, the management agent executes contents of the retrieved resource (document or script). At block 240, the management agent determines that the resource contains a call to the retrieval plugin and a reference to an external resource to be retrieved by the retrieval plugin. At block 245, processing logic determines a remote data store 105 containing the resource. At block 250, the management agent 180 sends a request for the resource to the data store 105. At block 255, the data store 105 sends the resource to the management agent 180.

At block 260, the management agent 180 executes the contents (e.g., scripts) of the retrieved resource. At block 265, the management agent 180 sends results of the execution of the various scripts executed at block 210, 235 and 260 to the management service. Alternatively, management agent 180 may return results to the management service periodically and/or as execution of specific scripts is completed rather than waiting until all of the scripts have completed.

Figure 3:
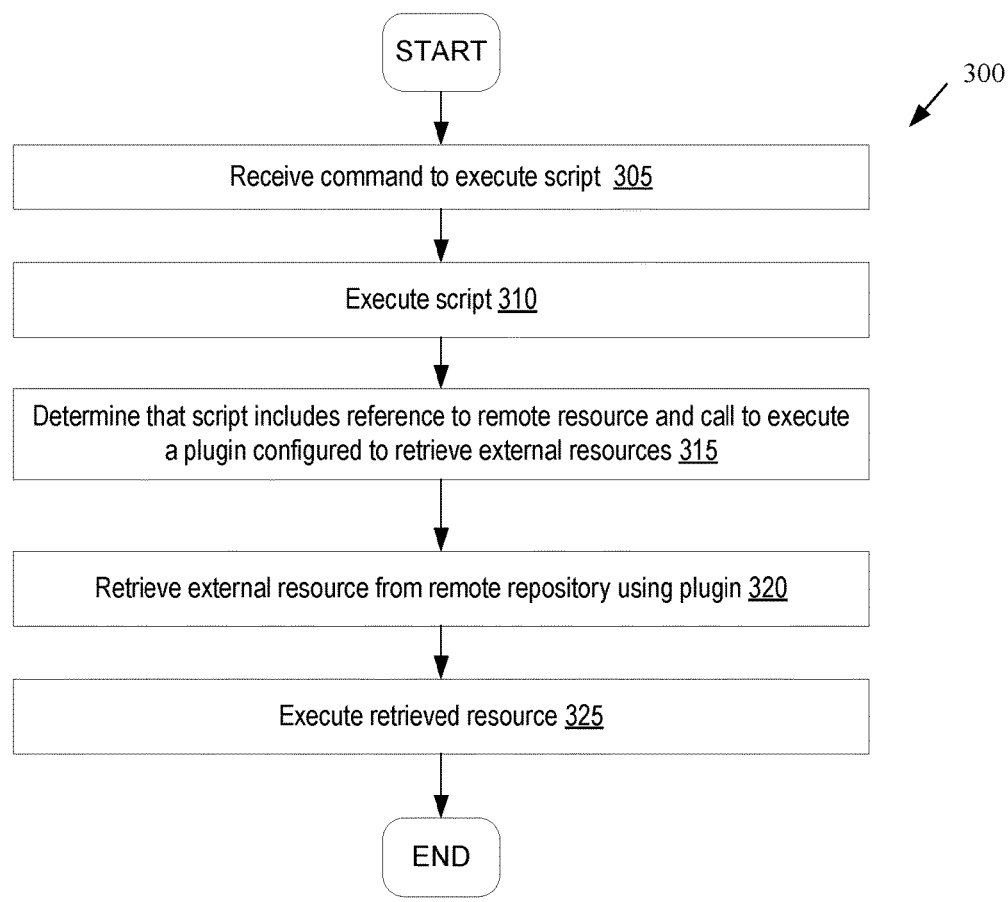
FIG. 3 depicts a flowchart illustrating one embodiment for a method of retrieving and executing a script or document maintained in a remote data store.
Figure 4A:
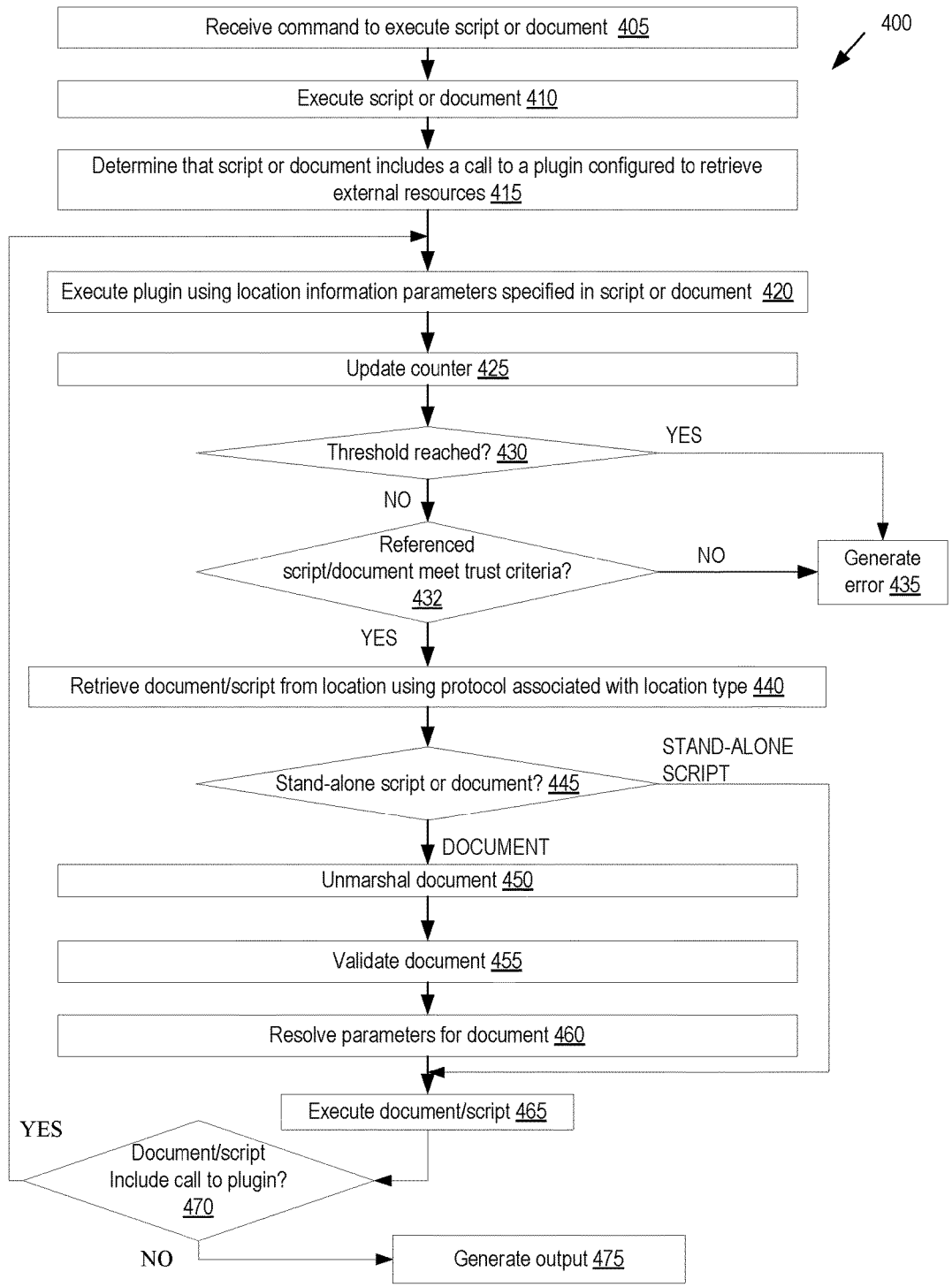
FIG. 4A depicts a flowchart illustrating one embodiment for a method of retrieving and executing one or more scripts or documents maintained in a remote data store.
Figure 4B:
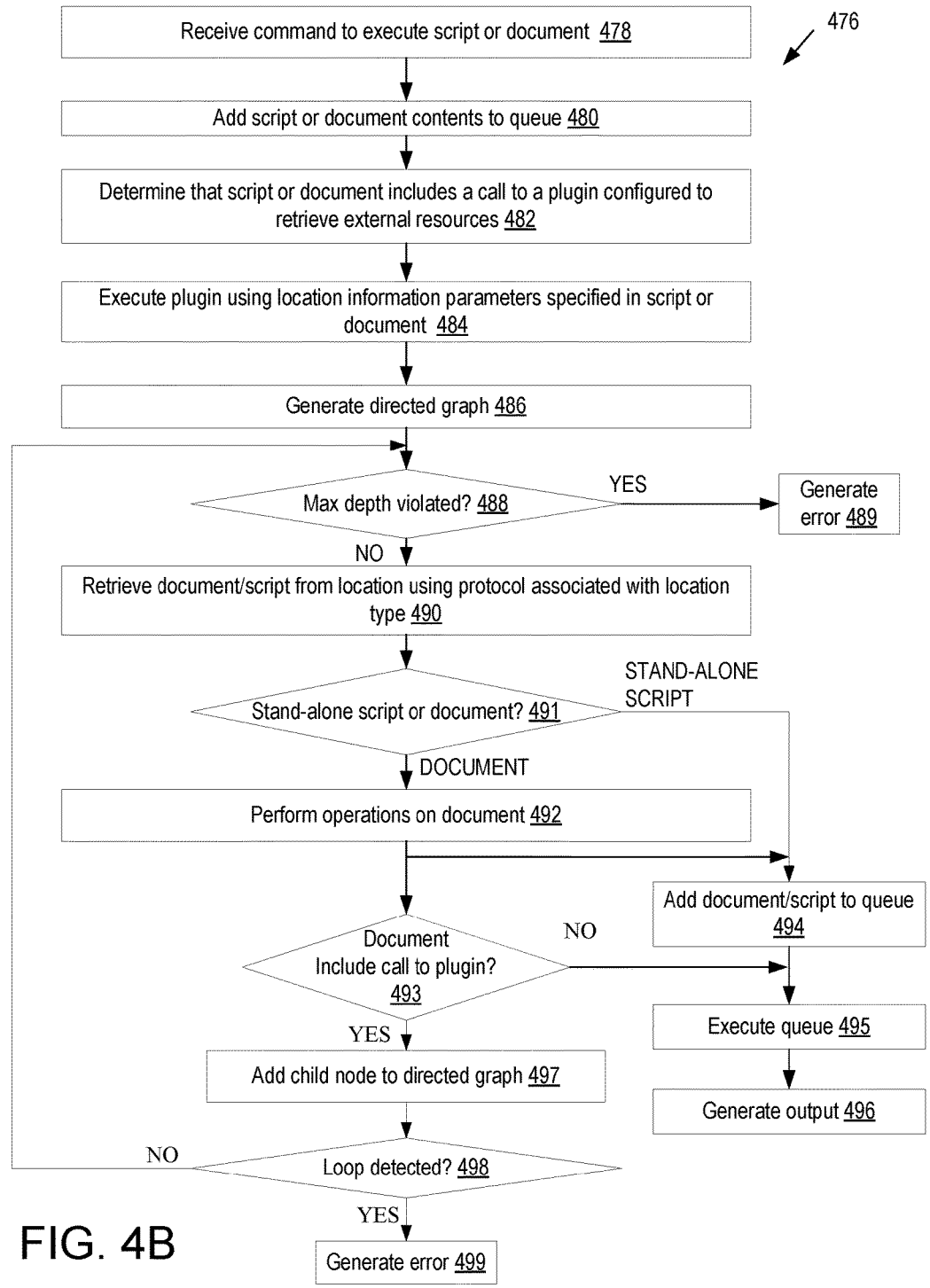
FIG. 4B depicts a flowchart illustrating one embodiment for a method of retrieving and executing one or more scripts or documents maintained in a remote data store.

FIGS. 3-4B are flow diagrams showing various methods for retrieving and executing a script or document maintained in a remote data store, in accordance with embodiments of the disclosure. The methods may be performed by a processing logic that may comprise hardware (e.g., circuitry, dedicated logic, programmable logic, microcode, etc.), software (e.g., instructions run on a processing device to perform hardware simulation), or a combination thereof. In one embodiment, at least some operations of the methods are performed by a computing device executing management agent, such as management agent 180 of FIG. 1.

For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

FIG. 3 depicts a flowchart illustrating one embodiment for a method 300 of retrieving and executing a script or document maintained in a remote data store. At block 305 of method 300, processing logic receives a command to execute a script or a document. At block 310, processing logic executes the script or document. At block 315, processing logic determines that the script or document includes a reference to a remote resource and a call to execute a plugin configured to retrieve external resources. At block 320, processing logic retrieves the external resource from the remote repository using the plugin and data from the reference to the remote resource (e.g., metadata included in the script or document). At block 325, processing logic executes the retrieved resource, which may be a document or a script.

Method 300 provides a method of indirection between documents and scripts, where documents and/or scripts may be embedded in instructions sent to computing devices from numerous remote sources. These documents and/or scripts may be essentially combined to form a composite document that is executed on a computing device. In one embodiment, all of the documents and/or scripts are first retrieved and input into an execution queue, and the documents and/or scripts are then executed in order in the execution queue. In one embodiment, documents and/or scripts are executed as they are retrieved.

FIG. 4A depicts a flowchart illustrating one embodiment for a method 400 of retrieving and executing one or more scripts or documents maintained in a remote data store. At block 405 of method 400, processing logic receives a command to execute a script or document. At block 410, processing logic executes the script or document. At block 415, processing logic determines that the script or document includes a call to a plugin configured to retrieve external resources.

At block 420, processing logic executes the plugin using location information parameters specified in the document or script. The location information parameters may include, for example, a location type, a URL, an IP address and port, a repository and/or directory name, and so on. At block 425, processing logic updates a counter. The counter is a depth counter that indicates the depth of references to external documents that have been made. In one embodiment, the counter is incremented for every processed document or script that includes one or more call to the plugin.

At block 430, processing logic determines whether a value of the counter is equal to or above a depth threshold. If the counter has a value that is equal to or above the depth threshold, then the method continues to block 435 and an error is generated. Additionally, any further calls to the plugin may not be executed, and no additional documents or scripts may be retrieved. If the counter has a value that below the depth threshold, then the method proceeds to block 432. The depth threshold may act as a proxy for loop detection, and limits the depth of references between documents to avoid loops.

In one embodiment, at block 432 processing logic determines whether the referenced document or script that is to be retrieved by the retrieval plugin has a trust rating that satisfies a trust criterion. In one embodiment, scripts and documents are associated with trust ratings. The trust ratings may be community trust ratings based on user feedback. Before a document or script is downloaded, the trust rating associated with that document or script may be determined and compared to a trust rating threshold. If the trust rating is below the trust rating threshold, then the document or script may fail to satisfy the trust criteria. If the trust criteria are not met, the method continues to block 435 and an error is generated. Additionally, the document or script is not retrieved (not downloaded). If the trust criteria are satisfied, the method proceeds to block 440.

At block 440, processing logic retrieves a document or script from a location set forth in the location information parameters using a protocol associated with a location type included in the location information parameters. The protocol may be set forth in the location information parameters or may be determined based on the location type.

At block 445, processing logic determines whether the retrieved resource is a document (e.g., that contains an encapsulated script) or a stand-alone script. This determination may be made by parsing the resource and applying one or more rules to the parsed resource. If the resource is a document, the method continues to block 450. If the document is a stand-alone script, then the method proceeds to block 465.

At block 450, processing logic unmarshalls (or deserializes) the document. Marshalling is the process of transforming a memory representation of an object to a data format suitable for storage or transmission (e.g., into a string). To "marshal" an object means to record its state and codebase(s) in such a way that when the marshalled object is "unmarshalled," a copy of the original object is obtained, possibly by automatically loading the class definitions of the object. To serialize an object means to convey its state into a byte stream such a way that the byte stream can be converted back into a copy of the object. Marshalling is like serialization, except marshalling also records codebases. In contrast, unmarshalling is the process of transforming a byte stream that has been marshalled from an object back into the object in memory. Deserializing is a similar process of transforming a byte stream that has been serialized from an object back into that object in memory.

At block 455, processing logic validates the document. Multiple different validation rules may be applied to validate the document. In one embodiment, a determination is made as to whether the document is a well formed document that complies with YAML formatting rules (for a YAML document) or that complies with JSON formatting rules (for a JSON document). In one embodiment, a schema of the document is validated by comparing the schema of the document to valid schema. If the schema of the document fails to match the valid schema, then validation fails. In one embodiment, parameters of the document are compared to one or more parameter rules. This may include determining that the values of various parameters are permissible values for those specific parameters. In one embodiment, parameter validation includes checking whether parameters have required or optimal values. In one embodiment, validating the document includes performing each of the above described validation operations or a subset of the validation operations.

If the document fails validation, then an error may be generated and the document may not be executed. If the document passes validation, the method continues to block 460.

At block 460, processing logic resolves the parameters for the document. The document may have parameters that are dependent on parameters of a previous document or script and/or that are dependent on an output of the previous document and/or script. These parameters may be passed into the document prior to execution of the document.

At block 465, processing logic executes the document or the script. Alternatively, the document or script may be added to an execution queue for later execution.

At block 470, processing logic determines whether the document (or script) includes a call to the retrieval plugin. If so, the method returns to block 420, and the operations of blocks 420-465 are performed for the referenced script or document. If the script or document does not include a reference to the retrieval plugin, then the method continues to block 475 and an output is generated. The output may be an output of each of the scripts included in documents and each of the stand-alone scripts that have been executed. The output may be provided to a management system running on a remote computing device in an embodiment. In an alternative embodiment, outputs may be generated as individual scripts and/or documents are processed rather than after all scripts and/or documents have been executed.

FIG. 4B depicts a flowchart illustrating one embodiment for a method 476 of retrieving and executing one or more scripts or documents maintained in a remote data store. At block 478 of method 476, processing logic receives a command to execute a script or document. At block 480, processing logic parses the command or script, and adds any scripts or plugin calls in the document other than a call to a retrieval plugin to an execution queue. At block 482, processing logic determines that the script or document includes a call to a plugin configured to retrieve external resources (referred to as a retrieval plugin).

At block 484, processing logic executes the plugin using location information parameters specified in the document or script. The location information parameters may include, for example, a location type, a URL, an IP address and port, a repository and/or directory name, and so on. At block 486, processing logic generates a directed graph (e.g., a directed acyclic graph). The directed graph may be used to determine whether any depth and/or loop criteria are violated.

In one embodiment, at block 488 processing logic determines whether a maximum depth criterion for the directed graph is violated. The depth of the directed graph may be a number of nodes between a root node and a leaf node that is furthest from the root node. If the maximum depth criterion is violated, the method continues to block 489 and an error is generated. Additionally, any further calls to the retrieval plugin may not be executed, and no additional documents or scripts may be retrieved. If the max depth is not violated, then the method proceeds to block 490.

In one embodiment (not shown), if the max depth is not violated at block 488 a trust rating associated with the document or script to be downloaded is determined and compared to a trust threshold. If the trust rating meets or exceeds the trust threshold, then the method continues to block 490. If the trust rating is below the trust threshold, then the method may continue to block 489.

At block 490, processing logic retrieves a document or script from a location set forth in the location information parameters using a protocol associated with a location type included in the location information parameters. This may include performing one or more authentication operations associated with the location type. For example, the document or script may be stored in a private location that is associated with security credentials such as a login and password. Authentication may include providing credentials to a data store that holds the document and/or script. The protocol may be set forth in the location information parameters or may be determined based on the location type.

At block 491, processing logic determines whether the retrieved resource is a document (e.g., that contains an encapsulated script) or a stand-alone script. This determination may be made by parsing the resource and applying one or more rules to the parsed resource. If the resource is a document, the method continues to block 492. If the document is a stand-alone script, then the method proceeds to block 494.

At block 492, processing logic performs one or more operations on the document, which may include unmarshalling the document, validating the document and/or performing parameter resolution for the document. The document may then be parsed, and one or more scripts or plugin calls (other than a call to a retrieval plugin) in the document may be added to the execution queue at block 494. Additionally, at block 493 processing logic determines whether the document includes a call to the retrieval plugin. If so, the method continues to block 497. Otherwise the method proceeds to block 495.

At block 497, processing logic adds a child node to the directed graph. In one embodiment, at block 498 processing logic then determines whether there are any loops from the directed graph. In one embodiment, processing logic determines whether a resource (document or script) has called another resource that already exists as a parent in the directed graph. This check may be performed based on a URL or other source location associated with each of the nodes in the directed graph. If there are no loops detected, the method returns to block 488. If a loop is detected, the method continues to block 499 and an error is generated.

At block 494, the documents and/or scripts are added to an execution queue. An execution queue may be used to maintain execution order of scripts and documents. The execution queue may be a flattened list of all documents and scripts that are to be executed based on a top level or root document or script. In one embodiment, after all of the documents and scripts are downloaded and there are no problems with cycles (loops) or document depth, an execution queue that was created is executed at block 495. At block 496, an output is then generated, which may be sent to a management system. In one embodiment, processing logic generates a list of all outputs from each of the documents and scripts (e.g., each of the sub-documents and/or scripts) that were executed in the order of execution. In one embodiment, the outputs are uploaded to a data store on completion.

Method 476 has described an embodiment in which an execution queue is created and execution is performed after all documents and scripts have been retrieved and added to the execution queue. In an alternative embodiment, execution of scripts and documents may begin before all sub-documents and scripts have been retrieved. In one embodiment, parallel execution of multiple scripts and/or documents is also supported.

Figure 5A:
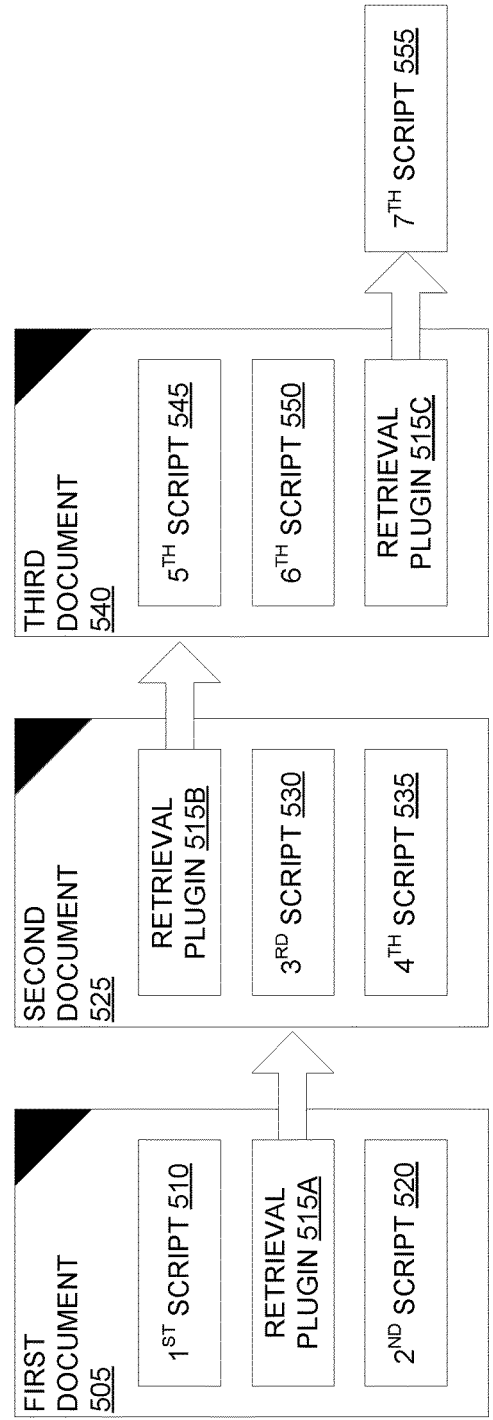
FIG. 5A is a block diagram illustrating disparate documents and scripts that can be executed together by a management agent, according to one embodiment of the present disclosure.

FIG. 5A is a block diagram illustrating disparate documents and scripts that can be executed together by a management agent, according to one embodiment of the present disclosure. As shown, a first document 505 includes a first script 510, a first call to a retrieval plugin 515A and a second script 520. The first call to the retrieval plugin 515A references second document 525, which includes a second call to the retrieval plugin 515B, a third script 530 and a fourth script 535. The second call to the retrieval plugin 515B references third document 540, which includes a fifth script 545, a sixth script 550 and a third call to the retrieval plugin 515C. The third call to the retrieval plugin 515C references a stand-alone seventh script 555. Any of the scripts 510, 520, 530, 535, 545, 550, 555 may be calls to other plugins included in a management agent. In one embodiment, first document 505, second document 525 and third document 540 are each scripts and first script 510, retrieval plugin 515A, second script 520, retrieval plugin 515B, third script 530, fourth script 535, fifth script 545, sixth script 550 and retrieval plugin 515C are all subscripts or components of scripts.

Figure 5B:
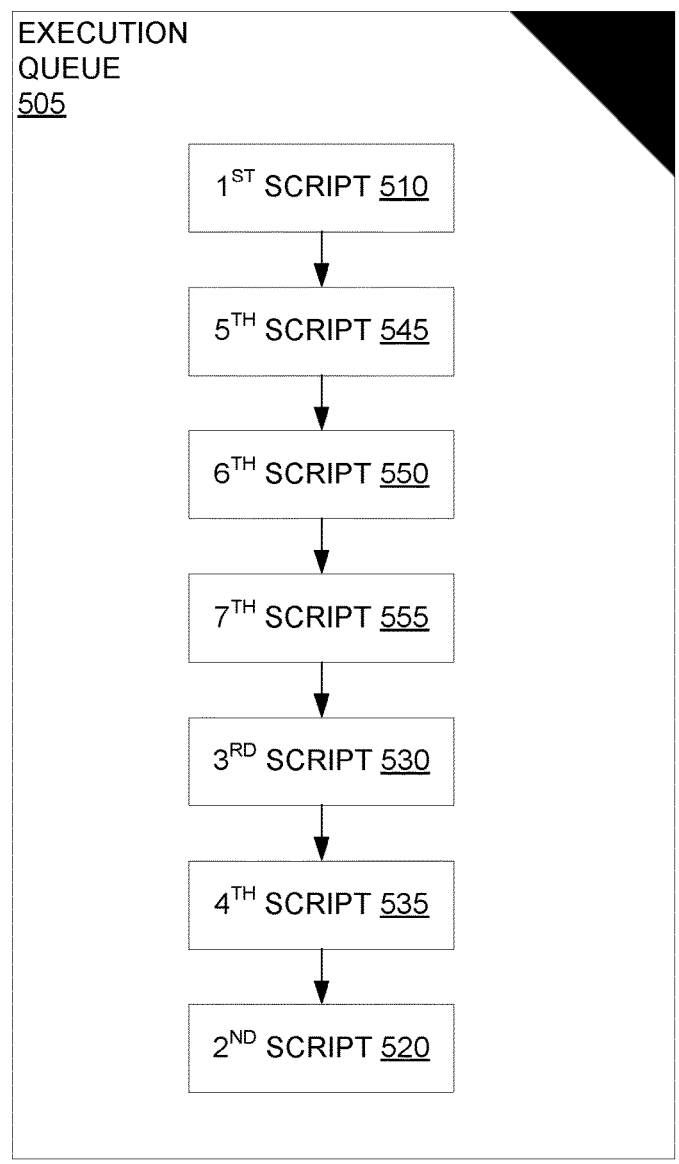
FIG. 5B illustrates an execution queue of the scripts included in the disparate documents and stand-alone scripts set forth in FIG. 5A, according to one embodiment of the present disclosure.

FIG. 5B illustrates an execution queue 505 of the scripts included in the disparate documents and stand-alone scripts set forth in FIG. 5A, according to one embodiment of the present disclosure. The execution queue includes, in the following order, first script 510, fifth script 545, sixth script 550, seventh script 555, third script 530, fourth script 535 and second script 520 in a flattened list. The order is based on the relative order of scripts and calls to the retrieval plugin in the various documents 505, 525, 540 of FIG. 5A.

Figure 6:
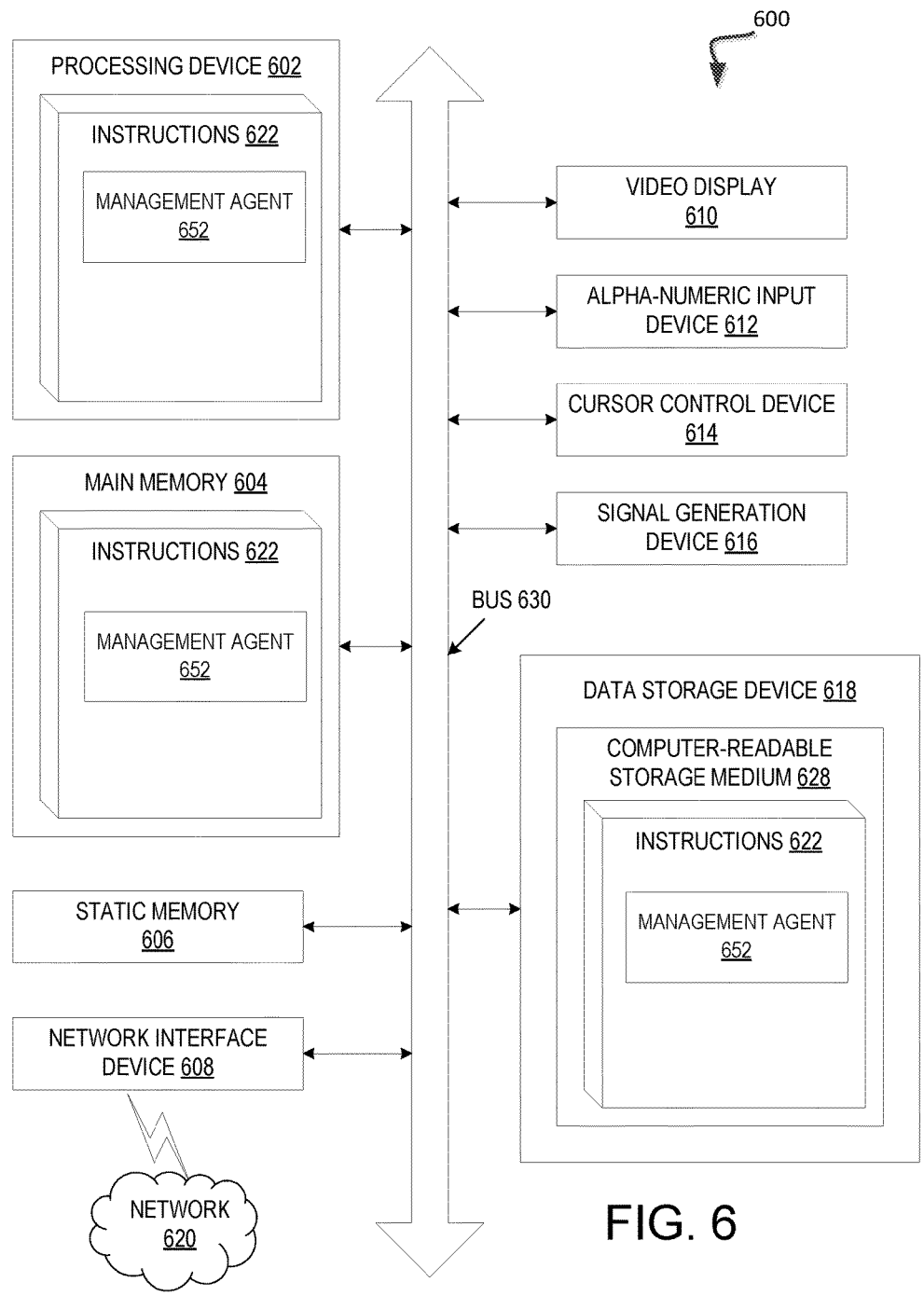
FIG. 6 is a schematic block diagram that provides one example illustration of a computing device executing a dataset suitability tester, according to one embodiment of the present disclosure.

FIG. 6 illustrates a diagrammatic representation of a machine in the exemplary form of a computer system (computing device) 600 within which a set of instructions, for causing the machine to perform any one or more of the methodologies discussed herein, may be executed. The system 600 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device (processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 618, which communicate with each other via a bus 630.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute instructions for a management agent 652 for performing the operations discussed herein. In one embodiment, management agent 652 corresponds to management agent 180 of FIG. 1.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a computer-readable storage medium 628 on which is stored one or more sets of instructions of the management agent 652 embodying any one or more of the methodologies or functions described herein. The instructions may also reside, completely or at least partially, within the main memory 604 and/or within processing logic of the processing device 602 during execution thereof by the computer system 600, the main memory 604 and the processing device 602 also constituting computer-readable media.

While the computer-readable storage medium 628 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any non-transitory computer-readable medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention. In the above description, numerous details are set forth.

It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "executing", "demarshalling", "validating", "resolving", "determining", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    executing a first script of a first document by a computing device, wherein the first document comprises one or more parameters and the first script is to perform one or more actions using the one or more parameters;
    determining, by the computing device, that the first document comprises a call to a plugin that is to retrieve a resource maintained on a source-control system, wherein the one or more parameters comprise a location of the resource maintained on the source-control system and a location type associated with the source-control system;
    executing the plugin to retrieve the resource from the location on the source-control system using a protocol associated with the location type;
    determining whether the resource is a second document;
    responsive to determining that the resource is the second document, performing one or more operations on the second document; and
    executing a second script of the resource.

2. The method of claim 1, wherein performing the one or more operations comprises:
    deserializing the second document;
    validating the second document; and
    resolving one or more additional parameters of the second document.

3. The method of claim 1, further comprising:
    determining that the resource comprises an additional call to the plugin;
    determining a depth of calls to the plugin;
    determining whether the depth of calls to the plugin exceeds a threshold; and
    failing to execute the plugin responsive to a determination that the depth of calls to plugin exceeds the threshold.

4. A system comprising:
    a processing device; and
    a memory to store computer executable instructions that, if executed, cause the processing device to:
        execute a first script, wherein the first script comprises one or more actions to be performed, a call to a plugin, and one or more parameters;
        determine that the first script comprises a reference to a second script stored in a remote data store;
        determine that the first script comprises the call to the plugin;
        execute the plugin using the reference to the second script to retrieve the second script over a network from the remote data store, wherein the one or more parameters comprise a location of the second script maintained on the remote data store and a location type associated with the remote data store; and
        execute the second script.

5. The system of claim 4, wherein the first script is encapsulated in a first document that comprises the first script and one or more parameters to be used in execution of the first script.

6. The system of claim 5, wherein the first document is a first object that conforms with at least one of Javascript object notation (JSON) or YAML.

7. The system of claim 4, wherein the instructions, if executed, further cause the processing device to:
    determine that the first script comprises a reference to a third script stored in a second remote data store;
    retrieve the third script over the network from the second remote data store; and
    execute the third script.

8. The system of claim 4, wherein the instructions, if executed, further cause the processing device to:
    determine a depth of references to external content, wherein the reference to the second script comprises a reference to external content;
    determine whether the depth of references exceeds a threshold; and
    fail to retrieve at least a portion of the external content responsive to a determination that the depth of references exceeds the threshold.

9. The system of claim 4, wherein the instructions, if executed, further cause the processing device to:
    construct a directed acyclic graph based on references between at least one of scripts or documents encapsulating scripts.

10. The system of claim 4, wherein the instructions, if executed, further cause the processing device to:
    determine that the second script relies on data stored together with the second script in a directory of the remote data store; and
    retrieve all contents of the directory.

11. The system of claim 4, wherein the instructions, if executed, further cause the processing device to:
    determine a trust rating associated with at least one of the second script or an author of the second script; and
    determine that the trust rating meets or exceeds a trust rating threshold prior to performing at least one of retrieving the second script or executing the second script.

12. A system of comprising:
    a processing device; and
    a memory to store computer executable instructions that, if executed, cause the processing device to:
        execute a first script, wherein the first script comprises one or more actions to be performed;

determine that the first script comprises a reference to a second script stored in a remote data store, wherein the second script is encapsulated in a document;

retrieve the second script over a network from the remote data store, wherein retrieving the second script comprises retrieving the document;

deserialize the document;

perform validation on the document; and responsive to determining that the document is valid, execute contents of the document, the contents comprising the second script.

13. The system of claim 12, wherein the instructions, if executed, further cause the processing device to:

determine that the document comprises a reference to a second document stored in the remote data store or in a second remote data store;

retrieve the second document over the network from the remote data store or the second remote data store; and execute contents of the second document.

14. A non-transitory computer-readable storage medium storing computer-executable instructions that, if executed by a processing device, cause the processing device to:

execute a first script, wherein the first script comprises one or more actions to be performed, a call to a plugin, and one or more parameters;

determine that the first script comprises a reference to a second script stored in a remote data store;

determine that the first script comprises the call to the plugin;

execute the plugin using the reference to the second script to retrieve the second script over a network from the remote data store, wherein the one or more parameters comprise a location of the second script maintained on the remote data store and a location type associated with the remote data store; and execute the second script.

15. The non-transitory computer-readable storage medium of claim 14, wherein the first script is encapsulated in a first document that comprises the first script and one or more parameters to be used in execution of the first script, wherein the first document is a first object that conforms with at least one of Javascript object notation (JSON) or YAML.

16. A non-transitory computer-readable storage medium storing computer-executable instructions that, if executed by a processing device, cause the processing device to:

execute a first script, wherein the first script comprises one or more actions to be performed;

determine that the first script comprises a reference to a second script stored in a remote data store, wherein the second script is encapsulated in a document retrieve the second script over a network from the remote data store, wherein retrieving the second script comprises retrieving the document;

deserialize the document;

perform validation on the document; and responsive to determining that the document is valid, execute contents of the document, the contents comprising the second script.

17. The non-transitory computer-readable storage medium of claim 14, wherein the instructions, if executed, further cause the processing device to:

determine a depth of references to external content, wherein the reference to the second script comprises a reference to external content;

determine whether the depth of references exceeds a threshold; and fail to retrieve at least a portion of the external content responsive to a determination that the depth of references exceeds the threshold.

18. The non-transitory computer-readable storage medium of claim 14, wherein the instructions, if executed, further cause the processing device to:

determine a trust rating associated with at least one of the second script or an author of the second script; and determine that the trust rating meets or exceeds a trust rating threshold prior to performing at least one of retrieving the second script or executing the second script.

19. The non-transitory computer-readable storage medium of claim 16, wherein the instructions, if executed, further cause the processing device to:

determine that the document comprises a reference to a second document stored in the remote data store or in a second remote data store;

retrieve the second document over the network from the remote data store or the second remote data store; and execute contents of the second document.

20. The non-transitory computer-readable storage medium of claim 16, wherein the first script is encapsulated in a first document that comprises the first script and one or more parameters to be used in execution of the first script, wherein the first document is a first object that conforms with at least one of Javascript object notation (JSON) or YAML.

* * * * *